No. 731,993. PATENTED JUNE 23, 1903.
C. A. BUSH.
AUTOMOBILE.
APPLICATION FILED OCT. 23, 1901.

NO MODEL. 2 SHEETS—SHEET 1.

No. 731,993. PATENTED JUNE 23, 1903.
C. A. BUSH.
AUTOMOBILE.
APPLICATION FILED OCT. 23, 1901.
NO MODEL. 2 SHEETS—SHEET 2.
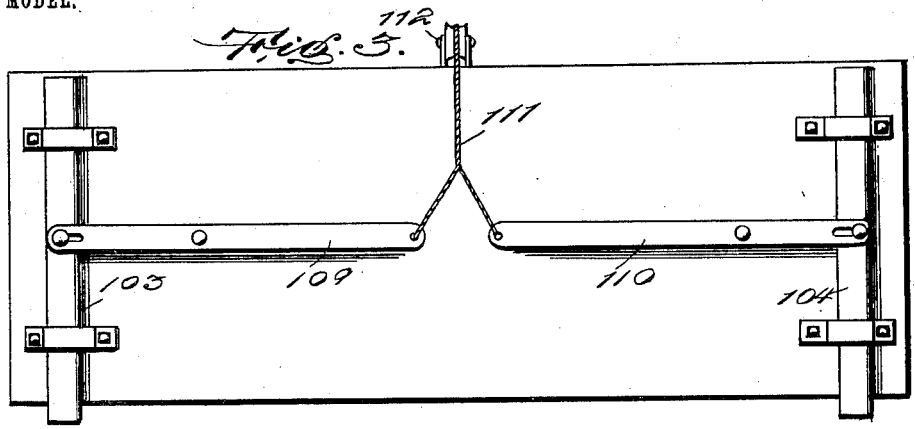
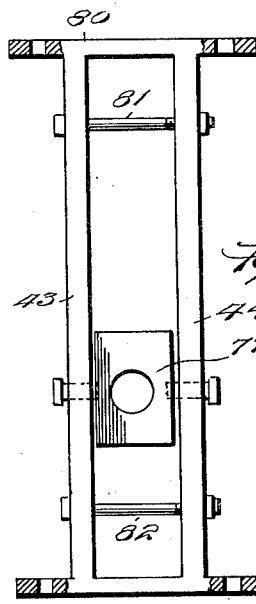
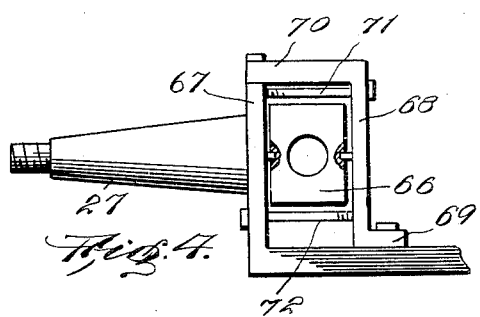
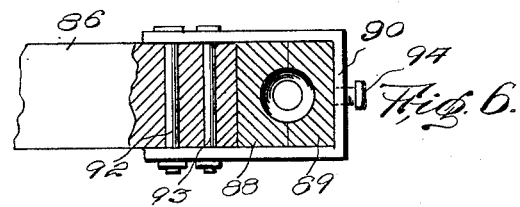
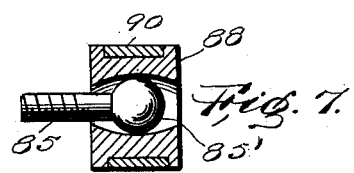

No. 731,993. Patented June 23, 1903.

UNITED STATES PATENT OFFICE.

CHARLES A. BUSH, OF CORRY, PENNSYLVANIA, ASSIGNOR OF ONE-HALF TO JOHN J. LOOMIS, OF NORTHEAST, PENNSYLVANIA.

AUTOMOBILE.

SPECIFICATION forming part of Letters Patent No. 731,993, dated June 23, 1903.

Application filed October 23, 1901. Serial No. 79,621. (No model.)

*To all whom it may concern:*

Be it known that I, CHARLES A. BUSH, a citizen of the United States, residing at Corry, in the county of Erie, State of Pennsylvania, have invented certain new and useful Improvements in Automobiles; and I do hereby declare the following to be a full, clear, and exact description of the invention, such as will enable others skilled in the art to which it appertains to make and use the same.

This invention relates to automobiles operated by steam, gas, electricity, or other power, and more particularly to that class operated with fluid-pressure engines, the object of the invention being to provide a construction and arrangement of engine and coöperating parts which will permit of the manufacture of an automobile at a low cost, a further object of the invention being to provide a construction which may be embodied in mechanisms for hauling coaches and cars, operating gang-plows, harrows, and grain-drills, and to propel other machinery.

Other objects and advantages of the invention will be understood from the following description.

In the drawings forming a portion of this specification, and in which like numerals of reference indicate similar parts in the several views, Figure 1 is a horizontal section taken directly beneath the body of an automobile and showing a construction and arrangement of mechanism embodying the present invention. Fig. 2 is a side elevation of an automobile equipped in accordance with the present invention, portions thereof being being broken away to show more clearly the mechanism. Fig. 3 is a bottom plan view of the engine-frame with the shifting-levers for moving the reversing mechanism. Fig. 4 is an elevation showing a portion of the rear axle of the vehicle with the wheel-spindle and showing also the bearing-box for one of the drive-shafts. Fig. 5 is an elevation showing one of the frames or stands in which is mounted the forward bearing-block for a drive-shaft. Fig. 6 is a view showing one end portion of a pitman with a socketed bearing-block connected with the end thereof. Fig. 7 is a section through the socketed bearing-block and showing a crank-pin having a ball-head engaged with the socket. Fig. 8 is a top plan view of the frame or stand shown in Fig. 5.

Referring now to the drawings, there is shown a construction of automobile including a body 20, such as is used upon the ordinary light wagon, and which body is provided with the front axle 21, connected by means of the usual king-bolt, and concentric with which is the usual fifth-wheel 22 to permit of easy turning of the axle to guide the vehicle, as hereinafter described.

The rear axle of the vehicle is shown at 23, and is what is known as a "downturned" axle, and if an ordinary wagon which is to be adapted as an automobile is not provided with a downturned axle one is supplied and secured thereto, the body being supported from the axle upon springs, as shown at 24.

In the present instance to drive the vehicle the rear wheels 25 and 26 are employed and which are rotatably mounted upon the spindles 27 of the rear axle, so they may turn freely and independently, and on the inner ends of the hubs of the drive-wheels and concentric therewith are secured the crown-gears 28 and 29, through which the wheels are driven forwardly or backwardly.

To actuate the drive-wheels, an engine is provided, and this engine in the construction shown includes the cylinder 30, which is disposed horizontally within the engine-frame 31, which is in the form of a casing or housing and is secured to the under side of the vehicle-body by a suitable number of bolts and is braced by the fore and aft braces 32 and 33, connected with the front and rear lower portions and extending slantingly and upwardly to the vehicle-body.

Upon the rear axle of the vehicle are the two pivoted boxes 66, mounted to swing in vertical planes between the vertical portions 67 of the axles and the frame members 68, disposed parallel with these vertical members and having feet 69 at their lower ends bolted against the axle, while at the upper ends thereof are the laterally-extending heads 70, which rest upon and are bolted to the upper ends of the portions 67 of the axle. The portions 68 are further held in place by the transverse bolt 71.

In the boxes 66 are disposed the drive-shafts 73 and 74, which extend at both sides of the boxes and have the gear wheels or pinions 75 and 76 secured thereto at opposite sides of the boxes and in such positions that if the shafts be moved forwardly the rear pinions 76 will engage the crown-gears 28 and 29, and if the shafts are moved rearwardly the pinions 76 will be disengaged and the pinions 75 will be engaged with the crown-gears. Thus with the shafts turning in the same directions at all times by shifting them the drive-wheels may be rotated either to move the vehicle forwardly or rearwardly, as desired.

The drive-shafts are taken forwardly of the vehicle and through the bearing-blocks 77, which are mounted pivotally between the sides 43 and 44 of the frames 79 and 80, bolted to the top and bottom of the engine-frame, the sides being held from outward displacement by means of the transverse bolts 81 and 82. Thus as the body of the vehicle rises and falls upon its supporting-springs the bearing-boxes may swing so that there will be no binding of parts and the shafts may be easily rotated.

At the front ends of the shafts are fixed the crank-disks 83 and 84, having cranks 85, which are provided with crank-pins having at their outer ends balls 85' and with which balls are engaged the socketed heads of the pitmen 86 and 87. Each socketed head consists of two parts 88 and 89, the outer edges of which are grooved to receive the metal strap 90, of U shape, and the ends of which are disposed upon and bolted to the pitman by means of the bolts 92 and 93, the parts of the head being held in proper mutual relation by the set-screw 94, which also takes up the wear of the parts. With this construction it will be seen that each pitman is connected with its respective crank-disk by a universal joint.

Reverting now to the piston-rods 39 and 40, it will be noted that the rod 40 has a laterally-extending arm 95, and this arm has a head at its outer end which is engaged in the socketed head 96 at the end of the pitman 87, thus giving a universal connection between the arm and pitman, so that the drive-shaft may be shifted longitudinally without interfering with the operation of the mechanism.

From the piston-rod 39 extends laterally the arm 98, which has also a ball-head engaged in the socketed block at the end of the pitman 86, the two pitmen, as shown, being at opposite sides of the engine-cylinder. The universal connections of the pitman 86 likewise permit of shifting of its connected drive-shaft without binding of parts. From the arm 98 extends at both sides the rod 99, engaged between friction-rollers 100, suitably mounted, and which prevent displacement of the piston-rod 39.

The two drive-shafts are held normally and yieldably in their forward positions, with their rear pinions engaged with the crown-gears, by means of the helical springs 101 and 102, which are disposed upon the shafts and rest with their ends against the front faces of the rear bearing-boxes and the rear faces of the forward pinions, respectively, and when the shafts are moved rearwardly it is against the tendency of these springs, so that when released they return to their normal positions.

To shift the drive-shafts rearwardly, the slide-bars 103 and 104 are mounted in guides upon the under side of the engine-frame and have their rear ends turned upwardly and bifurcated, as shown at 105 and 106, to embrace the drive-shafts between the flanges 107 and 108 thereon, so that when the slide-bars are moved longitudinally the shafts are moved. To move the slide-bars, levers 109 and 110 are pivoted to the under side of the engine-frame, the levers being in turn pivoted at their outer ends to the slide-bars. Attached to the inner ends of the levers are the ends of the bifurcations of the cable 111, which is taken forwardly and then upwardly over roller 112 and then forwardly over roller 113 to the lower end of the hand-lever 114, pivoted to the wagon-body or irons mounted thereon, and when this hand-lever is moved in one direction the cable is drawn and the levers are actuated to shift the slide-bars rearwardly to correspondingly move the drive-shafts, and when the hand-lever is released the drive-shafts return to their positions under the influence of the springs, as described. The hand-lever may be located at a convenient point of the vehicle-body.

Any suitable means may be used for actuating the front axle to steer the vehicle; but in the present instance a hand-wheel 115 is shown mounted at the upper end of the vertical shaft 116, journaled in bearings in the floor of the wagon-body. At the lower end of the shaft is the sprocket-wheel 117, with which is engaged the chain 118, to the ends of which are connected the cables 119 and 120. The cable 119 is taken rearwardly and then downwardly over the roller 121, then around a second roller, and then forwardly and attached to the front axle. The cable 120 is taken rearwardly and laterally to roller 122, then laterally and then downwardly over roller 123, then around roller 124, and then forwardly, and is attached to the front axle. Instead of using cables entirely sections of cables and rods may be used to prevent stretching. With this arrangement if the hand-wheel be rotated in one direction the vehicle-axle will be moved to steer the vehicle in one direction, and if the hand-wheel be moved in the opposite direction the axle will be moved to steer the vehicle in the opposite direction.

The brake mechanism includes the crown-gears 28 and 29, which are provided with grooves in their peripheries, and in these grooves are engaged the bent bars 126 and 127, one end of each of which is connected to the rear portion of the bottom of the engine-frame, the bars being taken rearwardly and then outwardly and around the crown-gears, and being connected at their opposite ends with the levers 127', which are pivoted to the under side of the vehicle-body. A chain has its ends connected to the inner ends of the levers, and at a central point of this chain is connected the chain 128, which is taken rearwardly and around the roller 129, then upwardly and over the roller 130, then laterally to the roller 131, and then forwardly and attached to the rod 132, which is connected at its forward end to the hand-lever 133, which is pivoted in the forward portion of the vehicle-body and at the right-hand side thereof, although it will be understood that it may be otherwise located, if desired, and instead of the chains mentioned cables may be used. By manipulation of this hand-lever it will be seen that the levers will be operated to draw upon the brake rods or band and engage them snugly with the grooves of the crown-gears to exert sufficient pressure to stop the vehicle.

The boiler for the engine (not shown) is disposed upon the rear axle of the vehicle and is connected with the steam-chest of the engine by means of the supply-pipe, having a throttle-valve 135. The throttle-valve has the stem 136 extending laterally therefrom and provided with a crank-arm 136', which is connected with the throttle-lever 137 by the connecting-rod 138, pivoted at the side of the seat of the vehicle.

It will be understood that in practice modifications of the specific construction shown may be made and that any suitable materials and proportions may be used for the various parts; also, that the invention involved broadly herein may be applied wherever possible.

Instead of securing the crown-gears to the hubs of the drive-wheels they may be formed integral therewith, while the brake-rods may be of any other specific cross-sectional shape to fit similarly-shaped grooves in the peripheries of the crown-gears.

What is claimed is—

1. In an automobile, the combination with the drive-wheels having crown-gears fixed thereto, of reciprocatory drive-shafts having pinions for alternate engagement with the crown-gears at diametrically opposite points as the shafts are reciprocated, a motor including piston-rods, and pitmen connecting the piston-rods with their respective drive-shafts and having ball-and-socket connections therewith.

2. In an automobile, the combination with the drive-wheels having crown-gears attached thereto, of reciprocatory drive-shafts each having spaced pinions for alternate engagement with the crown-gears, respectively, at different points thereof, means for holding the shafts yieldably at one limit of their reciprocatory movements, a lever mechanism connected with the shafts for shifting them against the tendency of said yieldable means, a motor comprising piston-rods, crank-disks upon the drive-shafts, and pitmen connecting the piston-rods with their respective crank-disks and having ball-and-socket connections therewith.

3. In an automobile, the combination with front and rear axles of a body yieldably supported therefrom, drive-wheels upon the rear axle, wheels upon the front axle, pivoted bearing-boxes upon the rear axle, pivoted bearing-boxes carried by the body, drive-shafts mounted in their respective bearing-boxes and operatively connected with the drive-wheels, and a motor carried by the body and operatively connected with the drive-shafts.

4. In an automobile, the combination with driving-wheels of a motor yieldably supported thereon, gears connected to the drive-wheels, longitudinal shiftable driving-shafts having pinions for alternate engagement with their respective gears, said motor comprising piston-rods and an attachment having universal connection with their respective piston-rods and drive-shafts.

In testimony whereof I affix my signature in presence of two witnesses.

CHARLES A. BUSH.

Witnesses:
SAML. G. SWEET,
ALBERT L. BUSH.